April 9, 1963
G. VETNE
3,084,363
LAWN SWEEPER OR THE LIKE
Filed May 14, 1962
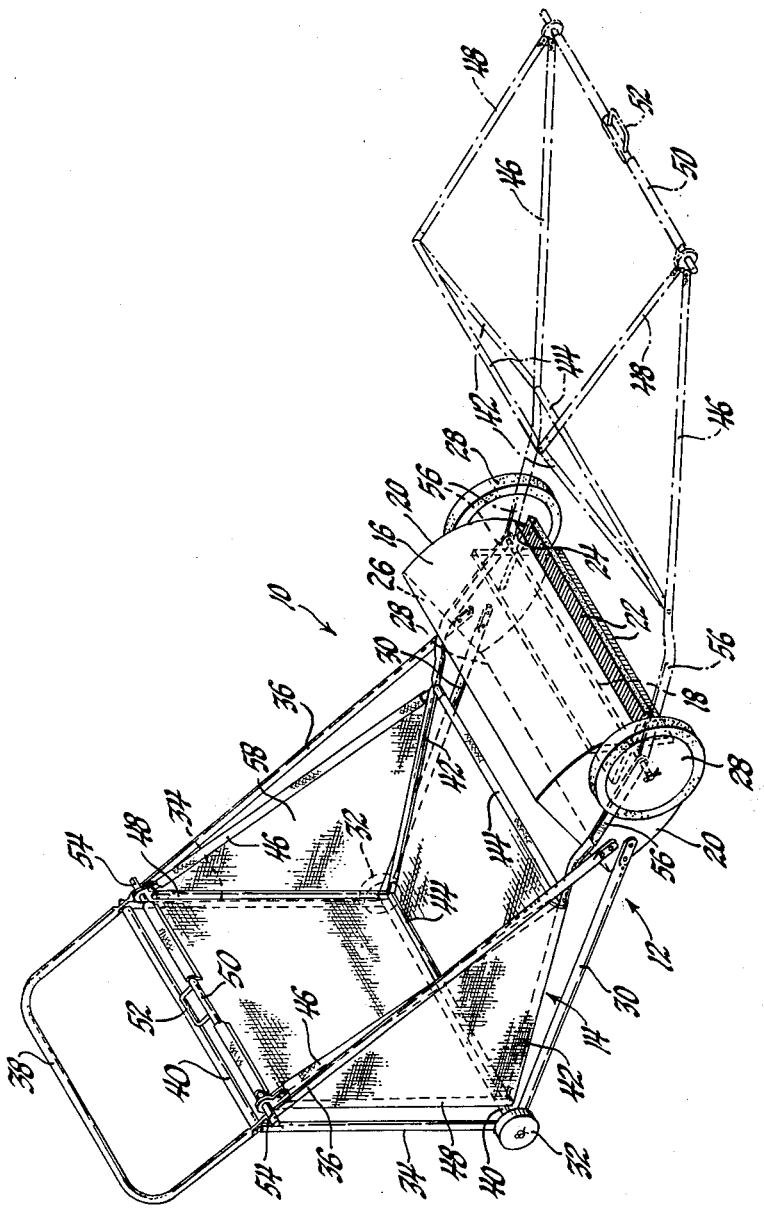
Gunnar Vetne
INVENTOR.
BY Roy A. Plant
ATTORNEY

– 1 –

3,084,363
LAWN SWEEPER OR THE LIKE
Gunnar Vetne, 140 Shadywood Lane, Battle Creek, Mich.
Filed May 14, 1962, Ser. No. 194,439
7 Claims. (Cl. 15—79)

This invention relates to an apparatus for collecting and discharging materials such as lawn clippings, leaves and the like and, in particular, to such an apparatus associated with a material pickup mechanism such as a lawn mower, sweeper or the like for collecting material therefrom for subsequent discharge entirely forward of such a pickup mechanism.

It has heretofore been suggested to provide lawn mowers, sweepers and the like with canvas bag containers secured to the main frame of the mower or sweeper to collect materials picked up and discharged rearwardly therefrom. In one apparatus of this type, after the container has been filled, the entire main frame of the mower or sweeper which mounts the container is pivoted forwardly to discharge the contents thereof into a storage pile or a burning heap of the materials being collected. As will be apparent, this procedure leaves much to be desired since considerable effort is required to tip the entire frame of the mower or sweeper including the full load of materials contained thereon, and may actually be physically impossible particularly where a heavy power mower is mounted on the frame, thereby necessitating complete disengagement of the container from the frame and transporting of same to the storage pile or burning heap. Furthermore, even where it is physically possible to tip the entire frame of the mower or sweeper, there is always the danger of a fire starting in the brushes of the sweeper or the motor of a power mower or otherwise damaging a similar type of pickup mechanism upon tipping the frame thereof over a burning heap of leaves or the like.

In another apparatus of this type, it has been suggested to pivotally mount the collection container to the main frame of the sweeper or mower for discharge rearwardly therefrom. However, this type of an arrangement leaves much to be desired because, due to the fact that the container is discharged rearwardly from the main frame, it is necessary to turn the latter around and back it up to the storage pile or burning heap on which the contents are to be deposited. As will be apparent, and apart from the fact that this type of operation involves considerable maneuvering of the main frame of the mower or sweeper, it can also be a dangerous procedure particularly where the main frame is to be backed up to a burning heap of leaves or the like. Furthermore, in arrangements of this type utilizing rearwardly discharging pivotally mounted collection containers on a main frame of a mower or sweeper, the pivoting of the container has been in the nature of a first-class lever in which the user of the mower or sweeper presses down on the rearward end of the container to effect pivoting movement and discharge of the contents thereof to the rear of the mower or sweeper. Since the container extends forward of its pivot point a distance greater than the rearward end extends therefrom, considerable effort is required in pivoting a container so mounted on the main frame of a mower or sweeper, and often can result in tipping of the mower or sweeper frame due to the reaction set up at the rear wheels thereof upon pivoting of the container. It was a recognition of these and other problems in this art which led to the conception and development of the present invention.

Therefore, the objects and features of the present invention include the provision of an improved apparatus for collection and discharging materials such as lawn clippings, leaves and the like which avoids these and other problems in the art.

It is yet another object and feature of this invention to provide an apparatus for collecting and discharging lawn clippings, leaves and the like comprising a main wheeled transportable frame means adapted to be pushed from the rear and including a suitable pickup means at the forward end thereof, such as a lawn mower, sweeper or the like, and a pivotally mounted container normally resting on the main frame means to receive materials discharged from the pickup means, while being pivotal to a position extending substantially entirely forwardly of the pickup means to discharge the contents thereof into a heap.

It is yet another object and feature of this invention to provide an apparatus of the type aforedescribed in which the container is mounted on a container frame means pivotally mounted about a transverse axis along a forward portion of the main frame means for movement between a collecting position embraced within the main frame means to the rear of the pickup means and a discharging position extending substantially entirely forwardly of the pickup means, and further characterized by a rear crossbar on the container frame means engageable with adjacent portions of the main frame means to normally retain the container frame means in a collecting position.

It is yet another object and feature of this invention to provide an apparatus of the type aforedescribed further characterized by an operating handle extending from the aforementioned rear crossbar of the container frame means for pivotal movement of the latter and the container mounted thereon toward the discharging position, whereby the container frame means acts as a second-class lever to minimize the physical effort required in dumping the contents of the container.

It is yet another object and feature of this invention to provide an apparatus of the type aforedescribed further characterized by the fact that the axis of pivotal movement of the aforementioned container frame means is so located relative to the forward portion of the main frame means, the wheel means and pickup means mounted thereon so that, in pivoting the container frame means to the aforementioned discharging position, the container frame means will extend substantially entirely forwardly of the pickup means for dumping the contents of the container into a burning heap of leaves or the like.

Still further objects, features and advantages of the invention will appear as the description proceeds.

To the accomplishment of the foregoing and related ends, the invention, then, consists of the means hereinafter fully described and particularly pointed out in the claims, the annexed drawing and the following description setting forth in detail certain means for carrying out the invention, such disclosed means illustrating, however, but one of various ways in which the principle of the invention may be used.

In the annexed drawing:

The single FIGURE is a perspective view of a lawn sweeper illustrating a preferred embodiment of the invention, the container frame means being shown in full lines in its collecting position and in dotted lines in its discharging position.

Referring now to the drawing, the numeral 10 generally indicates a lawn sweeper for picking up, collecting and ultimately discharging lawn clippings, leaves and the like, and comprises a main frame means indicated generally at 12 and an auxiliary or container frame means indicated generally at 14. The main frame means comprises a laterally extending housing 16 at the forward end thereof through which there extends a shaft 18 suitably rotatably mounted on the opposite side walls 20 of the housing. A plurality of spaced radially projecting lawn brushes 22 are mounted on shaft 18 for picking up leaves, lawn clippings and the like from the lawn through laterally elongate opening 24 in the lower front end of the housing, and discharging same through a laterally elongate opening 26 in an upper portion of the housing toward the rearward portion of the main frame means 12. Front wheel means 28 are secured to each end of the shaft 18 exteriorly and adjacent the side walls 20 of the housing to rotatably drive the shaft and form a support and transporting means at the forward end of the main frame means 12.

The main frame means further includes a pair of laterally spaced lower frame members 30 each having one end suitably secured to the respective side walls 20 of the housing 16, and extending rearwardly therefrom, rear wheel means 32 being journaled at the rearward ends thereof to form a support and transporting means for the rearward portion of the main frame means 12. A pair of laterally spaced substantially vertical rear frame members 34 each have their lower ends secured to the respective lower frame members 30 and their upper ends secured to the respective laterally spaced side frame members 36 preferably formed integrally with each other and interconnected by a yoke or handle 38 at the rearward end thereof. The forward ends of the respective side frame members 36 are suitably rigidly secured to the side walls 20 of the housing 16 so as to extend upwardly and rearwardly therefrom. Upper and lower bracing members 40 extend between and connect the opposite ends of rear frame members 34 and the other frame members connected thereto as illustrated in the drawing.

The auxiliary or container frame means 14 comprises a pair of laterally spaced base leg members 42 having forward and rearward portions thereof rigidly interconnected by the cross leg members 44. A pair of laterally spaced side leg members 46 each have one end secured to the respective base leg members adjacent the forward cross leg member 44 and extend upwardly and rearwardly therefrom for connection to the upper ends of respective ones of the laterally spaced substantially vertically upstanding rear post members 48 having their lower ends secured to the rearward cross leg member 44. A crossbar 50 including a handle 52 secured thereon extends between and is secured to the respective junctions of the side leg members 46 and the vertical post member 48, and includes stop portions 54 projecting laterally therebeyond for seating engagement with an upper rear portion of the side frame members 36. A pair of laterally spaced support arms 56, which may be formed integrally with the base leg members 42 or otherwise rigidly secured thereto, extend forwardly of the forward cross leg member 44 and downwardly therefrom, and have their forward ends freely pivotally journaled about the shaft 18.

A suitable container 58 is mounted on the framework of the container frame means 14 and is illustrated as being formed of a suitable fabric material such as asbestos conforming to the configuration of the container frame means to the rear of support arms 56 and having sewn portions thereof wrapped around the forward cross leg member 44, side leg members 46 and crossbar 50. However, the container may be formed of other fabric materials or a lightweight metal such as aluminum which presents no danger of fires when tipping the container into a burning heap of leaves or the like.

As indicated in full lines in the drawing, the auxiliary or container frame means 14 and the container 58 mounted thereon has a collection position nesting within the framework of the main frame means 12, and with the stop portions 54 of the crossbar 50 seated upon upper portions of the side frame members 36 of the main frame means. In this position, the apparatus may be pushed from behind by engaging the yoke or handle 38 to propel the apparatus along the ground, whereby the lawn brushes 22 will pick up and propel lawn clippings, leaves and the like through the housing 16 and opening 26 into the container. After the container is filled, the apparatus may be pushed directly up to a burning heap of the materials involved or a storage pile therefor with the front wheel means 28 and housing 16 immediately adjacent such heap or pile. Then, it is only necessary for the handle 52 to be grasped and the container frame means 12 and the container thereon easily pivoted upwardly and forwardly about the axis of the shaft 18 to the position illustrated in dotted lines in the drawing, thereby dumping or discharging the contents of the container entirely forwardly of the main frame means of the apparatus and particularly the housing 16 and the pickup means mounted therein.

In so dumping the container frame means, it will be noted that a second-class lever action is provided resulting not only in a desirable mechanical advantage in physically lifting the weight of the materials within the container, but also providing a reaction at the connection of the support arms 56 to the shaft 18 tending to hold and push the main frame means to the ground to stabilize the latter.

At this juncture, although a lawn sweeper of the well-known rotary brush type has been illustrated in the drawing and described herein as the means for picking up and discharging leaves, lawn clippings and the like into the container mounted on the container frame means, it will be readily apparent that the objects and advantages of the invention may also be obtained with other pickup means mounted on the forward portion of the main frame means, such as manual or power mower mechanisms mounted on the housing 16.

While but one form of the invention has been shown and described, other forms will now be apparent to those skilled in the art. Therefore, it will be understood that the embodiment shown in the drawing and described above is merely for illustrative purposes, and is not intended to limit the spirit and scope of the invention.

Other modes of applying the principle of my invention may be employed instead of the one explained, change being made as regards the apparatus herein disclosed, provided the means stated by any of the following claims or the equivalent of such stated means be employed.

I therefore particularly point out and distinctly claim as my invention:

1. An apparatus for collecting and discharging materials such as lawn clippings, leaves and the like comprising main frame means, wheel means mounted on said main frame means for transporting the latter along the ground, pickup means mounted on a forward portion of said main frame means for picking up and discharging materials rearwardly thereof, container frame means including a container mounted thereon, means pivotally connecting one end of said container frame means for movement about an axis on said forward portion of said main frame means, and cooperably engageable and disengageable stop means carried respectively by said main and container frame means remote from said axis, said container frame means being pivotally moveable about said axis between a collecting position in which said engageable and disengageable stop means of said main and container frame means are engaged with said container frame means nested within said main frame means rearwardly of said pickup means in position to receive materials discharged therefrom and a discharging position in which said engageable and disengageable stop means of said main and container frame means are disengaged and said container frame means extends forwardly from said axis to deposit the contents of said container forward of said pickup means.

2. An apparatus for collecting and discharging materials such as lawn clippings, leaves and the like comprising main frame means, front and rear wheel means rotatably mounted on said main frame means for transporting the latter along the ground, pickup means mounted on a forward portion of said main frame means for picking up and discharging materials rearwardly thereof, said main frame means including laterally spaced side frame members extending upwardly and rearwardly from said pickup means, container frame means including laterally spaced side legs, means pivotally connecting one end of each of said side legs for movement about an axis on said forward portion of said main frame means, a crossbar interconnecting said side legs remote from said axis and including stop means for engagement with said main frame means, and a container mounted on said container frame means for pivotal movement therewith about said axis, said container frame means and said container being pivotally moveable about said axis between a collecting position in which said stop portions of said crossbar rest on said frame members of said main frame means with said container therebetween to receive materials discharged from said pickup means and a discharging position in which said container frame means extends forwardly from said axis to deposit the contents of said container forward of said pickup means.

3. The appaartus defined in claim 2 in which said axis of pivotal movement of said container frame means is located no lower than the axis of rotation of said front wheel means.

4. The apparatus as defined in claim 2 in which said axis of pivotal movement of said container frame means is located at least as far forward on said main frame means as said pickup means and no lower than the axis of rotation of said front wheel means.

5. The apparatus as defined in claim 2 in which said axis of pivotal movement of said container frame means is coaxial with the axis of rotation of said front wheel means.

6. The apparatus as defined in claim 2 further comprising a yoke member interconnecting and extending rearwardly beyond said side frame members for pushing said main frame means.

7. The apparatus as defined in claim 6 further comprising handle means secured to said crossbar between said side legs for controlling pivotal movement of said container frame means.

References Cited in the file of this patent
UNITED STATES PATENTS

| | | |
|---|---|---|
| 640,995 | Coldwell | Jan. 9, 1900 |
| 3,035,294 | Stout et al. | May 22, 1962 |